US009969124B2

(12) United States Patent
Vaccari

(10) Patent No.: US 9,969,124 B2
(45) Date of Patent: May 15, 2018

(54) METHOD AND DEVICE FOR WELDING PROFILED ELEMENTS IN PLASTIC MATERIAL, IN PARTICULAR PVC

(71) Applicant: Andrea Vaccari, Nonantola (IT)

(72) Inventor: Andrea Vaccari, Nonantola (IT)

(73) Assignee: GRAF SYNERGY S.R.L., Nonantola (MO) (IT)

( * ) Notice: Subject to any disclaimer, the term of this patent is extended or adjusted under 35 U.S.C. 154(b) by 503 days.

(21) Appl. No.: 14/381,391

(22) PCT Filed: Mar. 4, 2013

(86) PCT No.: PCT/IB2013/051698
§ 371 (c)(1),
(2) Date: Aug. 27, 2014

(87) PCT Pub. No.: WO2013/132406
PCT Pub. Date: Sep. 12, 2013

(65) Prior Publication Data
US 2015/0101746 A1  Apr. 16, 2015

(30) Foreign Application Priority Data

Mar. 7, 2012 (IT) .............................. MO2012A0057
Mar. 15, 2012 (IT) .............................. MO2012A0067
(Continued)

(51) Int. Cl.
*B29C 65/18* (2006.01)
*B23B 3/28* (2006.01)
(Continued)

(52) U.S. Cl.
CPC .............. *B29C 65/18* (2013.01); *B23C 3/305* (2013.01); *B23Q 11/0046* (2013.01);
(Continued)

(58) Field of Classification Search
CPC ......... Y10T 156/1026; Y10T 156/1064; Y10T 156/1066; Y10T 156/108; Y10T 156/125;
(Continued)

(56) References Cited

U.S. PATENT DOCUMENTS 3,013,925 A * 12/1961 Larsen ................ B29C 65/7802
156/153
3,902,943 A    9/1975 Debliek
(Continued)

FOREIGN PATENT DOCUMENTS

DE    2433533    4/1975
DE    2923453    12/1980
(Continued)

OTHER PUBLICATIONS

"Heated Tool Welding of Thermoplastic Mouldings in Series Production", Welding in the world, Elsevier/ International Institute of Welding, Roissy, FR, vol. 30, No. 11/12, Nov. 1, 1992, pp. 319-328, XP000320924.
(Continued)

*Primary Examiner* — Linda L Gray
(74) *Attorney, Agent, or Firm* — Young & Thompson

(57) ABSTRACT

A method for welding profiled elements in plastic material, includes the steps of: preparing two profiled elements, arranged with respective zones to be facing one another; making a groove in correspondence to at least one zone, by a removal operation on a peripheral edge of at least one profiled element; heating the zones to be welded; coupling the zones to be welded to one another, pressing the profiled elements one against the other so as to keep the zones to be welded in reciprocal contact. The coupling step includes: melting the zones to be welded into one another in order to define a welding bead; making a containing compartment defined by the groove, the welding bead being made inter-
(Continued)

nally of the containing compartment; and arranging a containing presser in correspondence to the containing compartment for preventing exit of the welding bead from the compartment itself.

12 Claims, 15 Drawing Sheets

(30) Foreign Application Priority Data

Aug. 20, 2012 (IT) .............................. MO2012A0200
Aug. 20, 2012 (IT) .............................. MO2012A0201

(51) Int. Cl.
| | | |
|---|---|---|
| *E06B 3/96* | (2006.01) | |
| *B23Q 11/00* | (2006.01) | |
| *B23C 3/30* | (2006.01) | |
| *B29C 65/14* | (2006.01) | |
| *B29C 65/20* | (2006.01) | |
| *B29C 65/00* | (2006.01) | |
| *B29C 65/30* | (2006.01) | |
| *B29C 65/78* | (2006.01) | |
| *B26D 3/10* | (2006.01) | |
| *B29C 65/74* | (2006.01) | |
| *B29L 31/00* | (2006.01) | |
| *B29C 65/32* | (2006.01) | |
| *B29C 65/82* | (2006.01) | |
| *B29K 27/06* | (2006.01) | |
| *B29K 105/00* | (2006.01) | |

(52) U.S. Cl.
CPC ............ *B23Q 11/0064* (2013.01); *B26D 3/10* (2013.01); *B29C 65/1432* (2013.01); *B29C 65/2015* (2013.01); *B29C 65/2061* (2013.01); *B29C 65/2092* (2013.01); *B29C 65/305* (2013.01); *B29C 65/745* (2013.01); *B29C 65/7841* (2013.01); *B29C 66/00* (2013.01); *B29C 66/02241* (2013.01); *B29C 66/1162* (2013.01); *B29C 66/1282* (2013.01); *B29C 66/12841* (2013.01); *B29C 66/223* (2013.01); *B29C 66/322* (2013.01); *B29C 66/326* (2013.01); *B29C 66/52431* (2013.01); *B29C 66/71* (2013.01); *B29C 66/72523* (2013.01); *B29C 66/73921* (2013.01); *B29C 66/81427* (2013.01); *B29C 66/81433* (2013.01); *B29C 66/81435* (2013.01); *B29C 66/8414* (2013.01); *B29C 66/8762* (2013.01); *E06B 3/9608* (2013.01); *B29C 65/32* (2013.01); *B29C 65/749* (2013.01); *B29C 65/8207* (2013.01); *B29C 66/0042* (2013.01); *B29C 66/8167* (2013.01); *B29K 2027/06* (2013.01); *B29K 2105/253* (2013.01); *B29L 2031/005* (2013.01); *Y10T 156/1064* (2015.01)

(58) Field of Classification Search
CPC ......... Y10T 156/1322; Y10T 156/1378; Y10T 156/1744; B32B 38/0004; B32B 38/004; B32B 38/10; B32B 38/105; B32B 37/06; B32B 37/1045; B29C 65/749; B29C 65/20; B29C 65/7419; B29C 65/7451; B29C 66/0224; B29C 66/522; B29C 66/524; B29C 66/65; B29C 66/73921
See application file for complete search history.

(56) References Cited

U.S. PATENT DOCUMENTS 6,656,318 B1 * 12/2003 Sabouraud .............. B29C 65/20
156/158
8,128,853 B2 * 3/2012 St. Onge .............. B29C 65/2015
156/304.2

FOREIGN PATENT DOCUMENTS

| | | |
|---|---|---|
| DE | 2923935 | 12/1980 |
| DE | 3039733 | 5/1982 |
| DE | 19906340 | 9/1999 |
| DE | 19958412 | 6/2001 |
| DE | 10148265 | 4/2003 |
| EP | 0264052 | 4/1988 |
| FR | 1401370 | 6/1965 |
| FR | 2078436 | 11/1971 |
| GB | 2246318 | 1/1992 |
| GB | 2376657 | 12/2002 |
| JP | S498942 | 3/1974 |
| WO | 9612863 | 5/1996 |
| WO | 2012016991 | 2/2012 |

OTHER PUBLICATIONS

"Heizelemente MIT Profil", Plastverarbeiter, Huethig GmbH, Heidelberg, DE, vol. 49, No. 2, Feb. 1, 1998, pp. 80, 82, 84; XP000767434.
Potente et al: "Heizelementschweissen Von Gefuellten Und Verstaerkten Thermoplasten", Schweissen & Schneiden, DVS Verlag, Dusseldorf, DE, vol. 50, No. 3, Mar. 1, 1998, XP000754995.

* cited by examiner

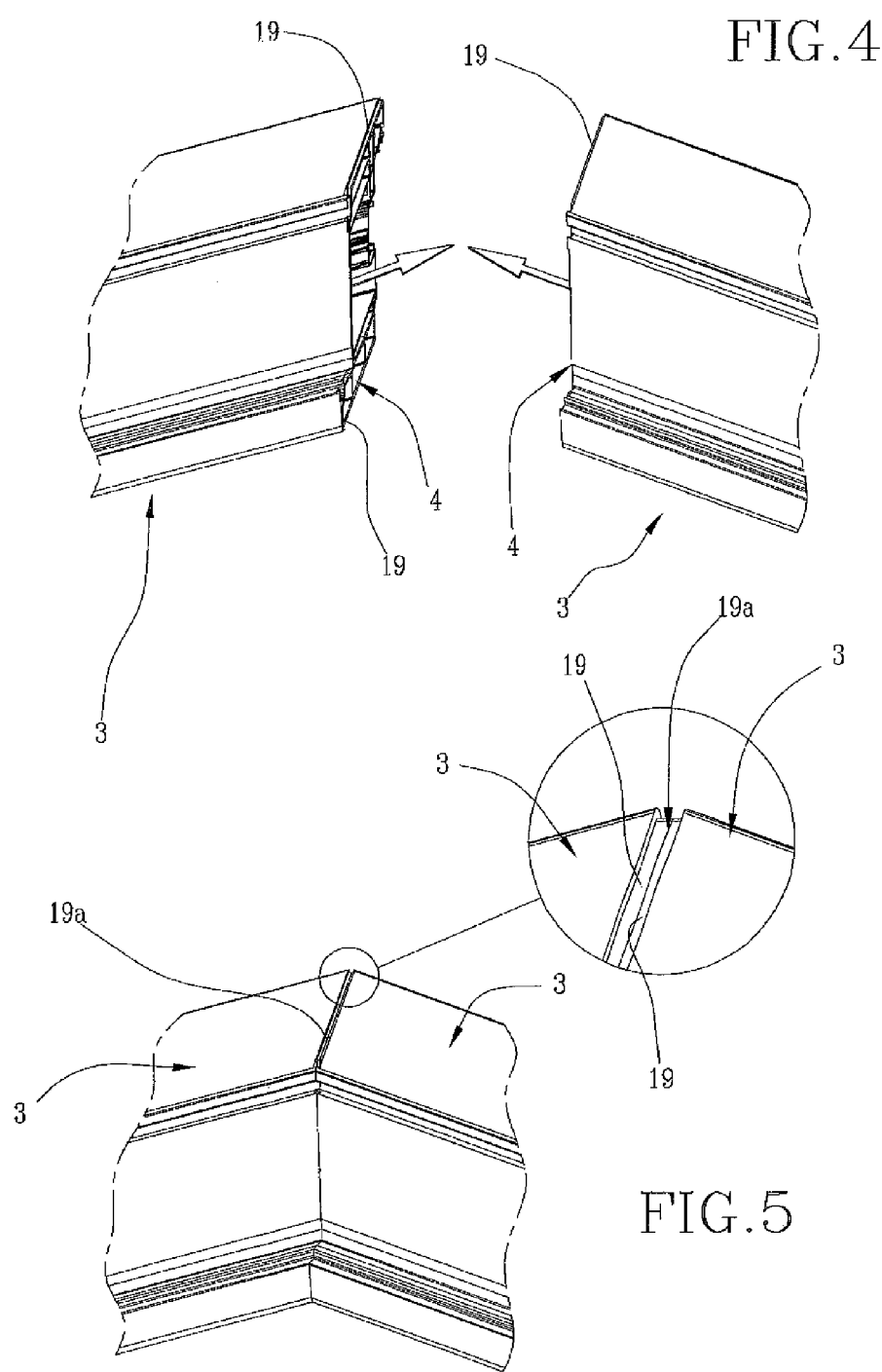

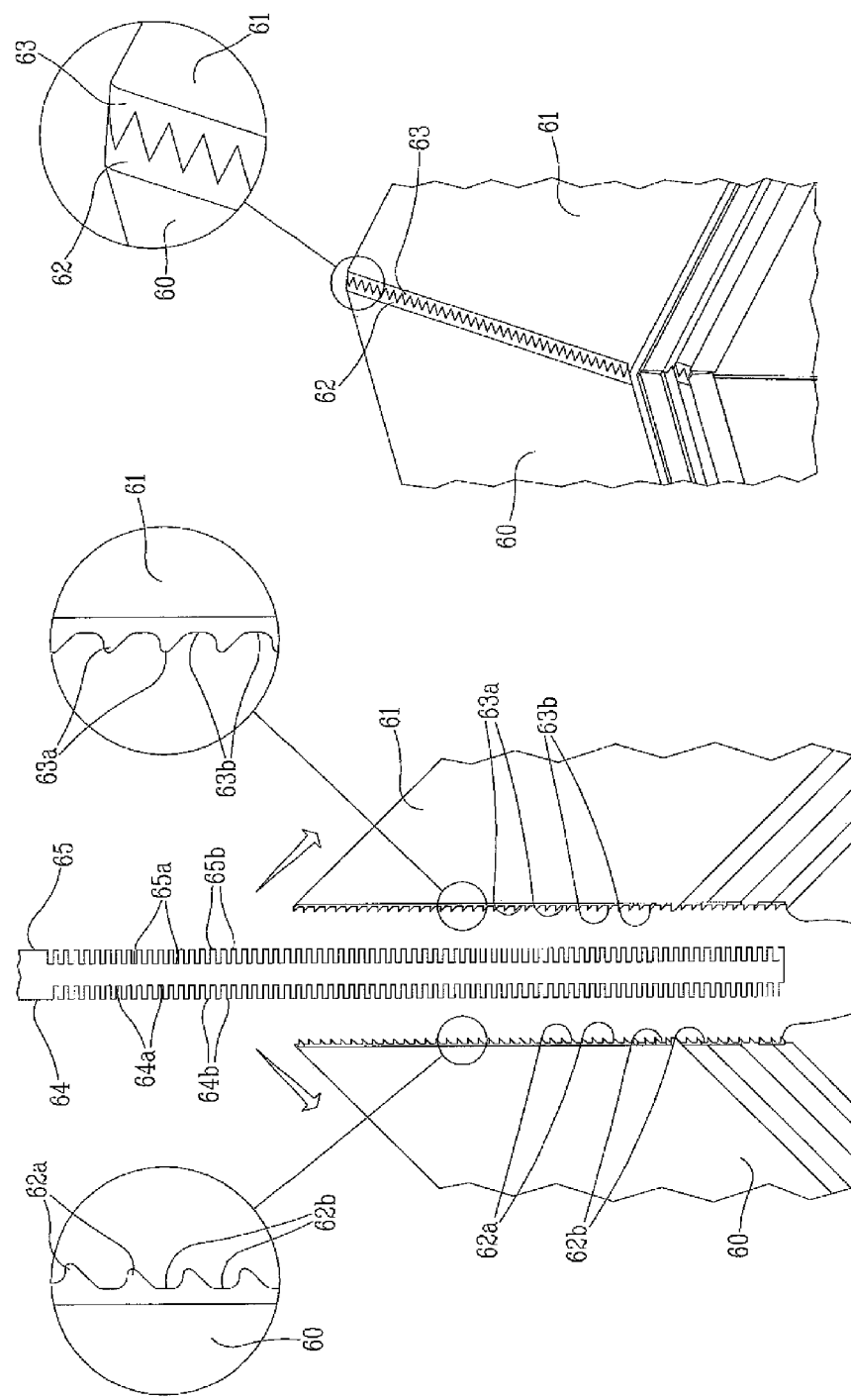

METHOD AND DEVICE FOR WELDING PROFILED ELEMENTS IN PLASTIC MATERIAL, IN PARTICULAR PVC

TECHNICAL FIELD

The present invention relates to a method and relative device for welding profiled elements in plastic material, in particular PVC.

BACKGROUND ART

In the state of the art, the PVC profiled elements, mainly used as window and door frames, are welded together by means of the melting of respective head surfaces in order to make a frame structure fittable to doors or windows.

In particular, the melting is done by heating the portions to be connected using suitable electric heating plates and then pressing the heated portions the one against the other to favor melting.

Generally, the heated portions are the head extremities of the profiled elements, suitably cut at 45° to define e.g. a right-angled portion of a respective window or door frame.

This method is carried out by welding machines equipped with respective retaining members of the profiled elements, mobile in a reciprocal closer moving direction to bring the heated extremities to be welded into contact.

Such machines are also equipped with finishing systems, suitable for removing the bead or welding bead which forms during the melting of the two profiled elements.

In fact, in correspondence to the joining line of the two profiled elements (surfaces cut at 45°), the portion of melted material in excess comes out and goes to form a bead protruding from the visible surface of the profiled elements. For this reason, in order to give the finished door or window frame an appreciable aesthetic appearance, once welded the profiled elements undergo a bead removal operation.

The known welding devices briefly described do however have major drawbacks mainly tied to the formation of the above-mentioned welding bead.

It must in fact be considered that the welding zone of the PVC profiled elements is not perfectly uniform and consequently, to make the profiled elements even, a lot of material is melted with the consequent formation of an abundant bead, and there is consequently a lot of waste material to be removed.

Furthermore, the finishing jobs for removing the bead and cleaning the welding zone have a strong effect on the total time required to machine the door or window frame. It should be realized in fact that for every door or window frame welding operation, the profiled elements have to be subsequently machined. Furthermore, in the case of spoked profiled elements, the removal of said bead is very complicated.

Furthermore, the machinery used for the above-mentioned finishing operations is cumbersome and particularly expensive.

This results in the need to sustain additional costs and work times because of the presence of further cumbersome equipment and tools.

DESCRIPTION OF THE INVENTION

In this context, the technical aim underlying the present invention is to propose a method and relative device for welding profiled elements in plastic material, in particular PVC, which overcomes the drawbacks of the above-mentioned state of the art.

In particular, the object of the present invention is to place at disposal a method and relative device for welding two profiled elements made in plastic material, in particular PVC able to eliminate all subsequent additional operations suitable for removing the welding bead.

Another object of the present invention is to envisage a method for welding profiled elements in plastic material, in particular PVC, that is fast, cheap and with reduced space.

The above objects are achieved by a method and relative device for welding profiled elements in plastic material, in particular PVC, comprising the technical specifications stated in any of the enclosed claims.

BRIEF DESCRIPTION OF THE DRAWINGS

Other characteristics and advantages of the present invention will become more evident from the approximate but non-limitative description of several preferred, but not sole, embodiments of a method and relative device for welding profiled elements in plastic material, in particular PVC, illustrated in the annexed drawings in which:

FIGS. 4 and 5 show PVC profiled elements during the steps of reciprocal moving closer;

FIGS. 15 to 17 show, in a succession of plan views, the operation of the device in FIG. 11;

FIG. 18 is an axonometric view, on enlarged scale, of a detail of the profiled elements after welding obtained by means of the device in FIG. 11.

EMBODIMENTS OF THE INVENTION

Figure 1A:
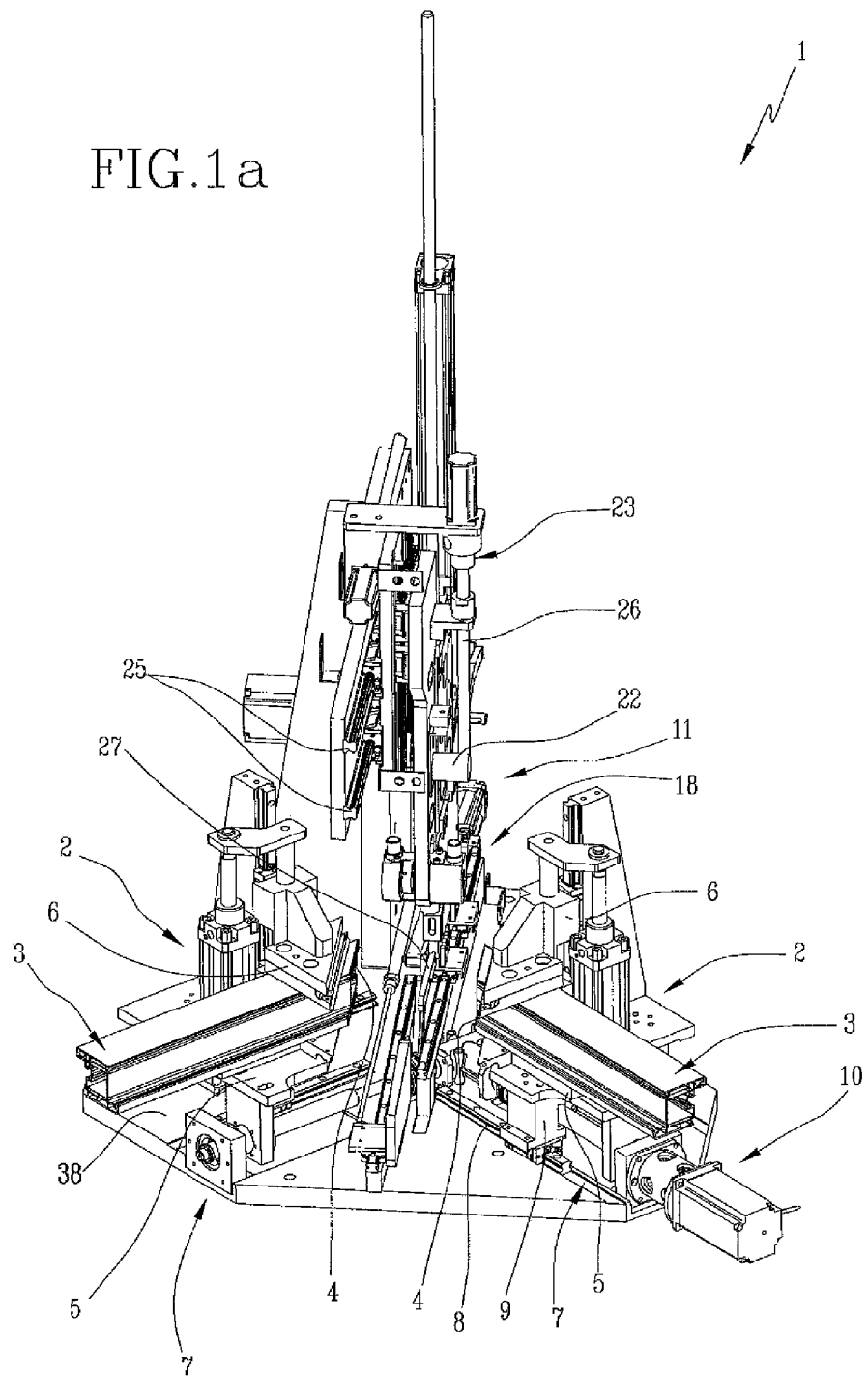
FIGS. 1a and 1b show perspective and schematized views of a one-head device (the heads can be repeated on machines which work 4-6 corners simultaneously) for welding profiled elements in plastic material, in particular PVC, according to the present invention.

With particular reference to figures from 1a to 3, indicated by 1 is a device or method for welding profiled elements in plastic material, in particular PVC.

Such device implements a method, or procedure, for welding profiled elements in plastic material, in particular PVC, wherein are arranged at least two profiled elements 3, with respective zones to be welded 4 facing one another.

The plastic material from which the profiled elements 3 are made is, e.g., PVC, but plastic materials of the heat-sealable type other than PVC cannot be ruled out.

As will be better specified below according to the method, before the step of heating and welding the profiled elements 3, a groove 19 is made in correspondence to at least one zone to be welded 4 of the profiled elements 3 by means of a removal operation (milling, melting, chamfering, etc.).

Subsequently, the zones to be welded 4 are heated and coupled, or joined, by pressing the profiled elements 3 one against the other to keep the zones 4 in reciprocal contact. This way, the groove 19 or the grooves 19 of the two profiled elements 3 define a containing compartment 19a for containing a bead or welding bead produced during the melting of the respective profiled elements 3.

In the rest of the present description, a single welding device 1 will be illustrated suitable for welding the extremities of the two respective profiled elements. Nevertheless, the present invention can comprise a series of devices 1, each of which operating on a respective extremity of a profiled element 3. For example, to make a rectangular frame to be used as a door or window frame, four devices 1 are used, each intended to weld the profiled elements 3 in correspondence to right angles of the mentioned frame.

Figure 1B:
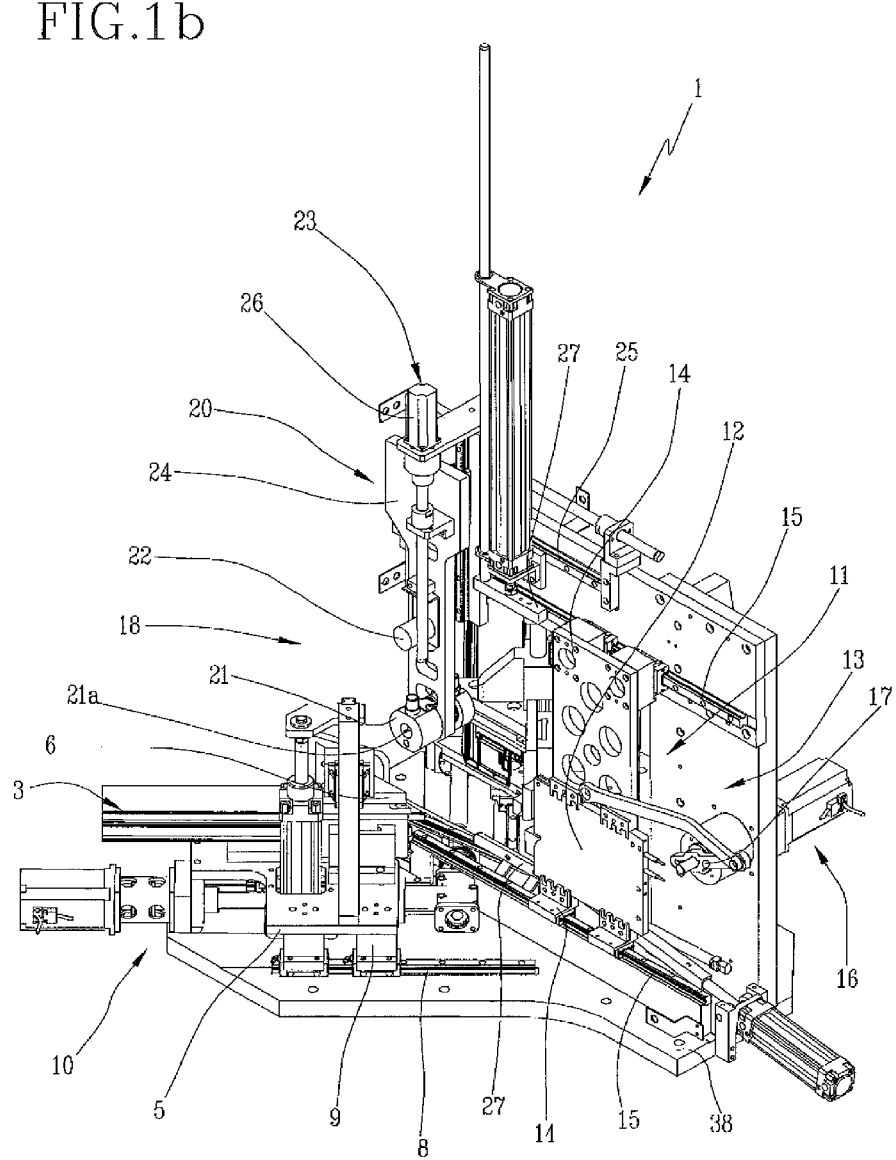
Figure 2A:
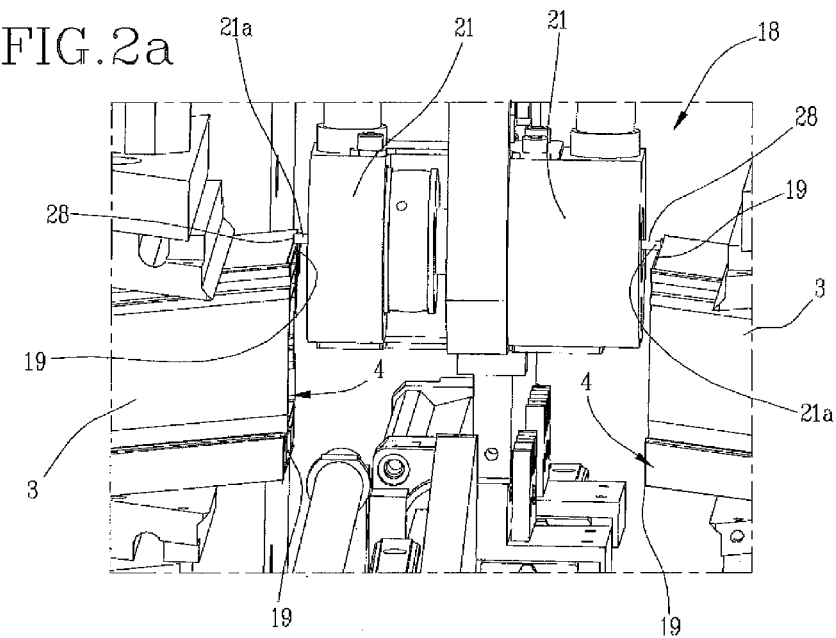
FIGS. 2a, 2b, 2c show details of the device in FIGS. 1a and 1b in respective operating conditions.
Figure 2B:
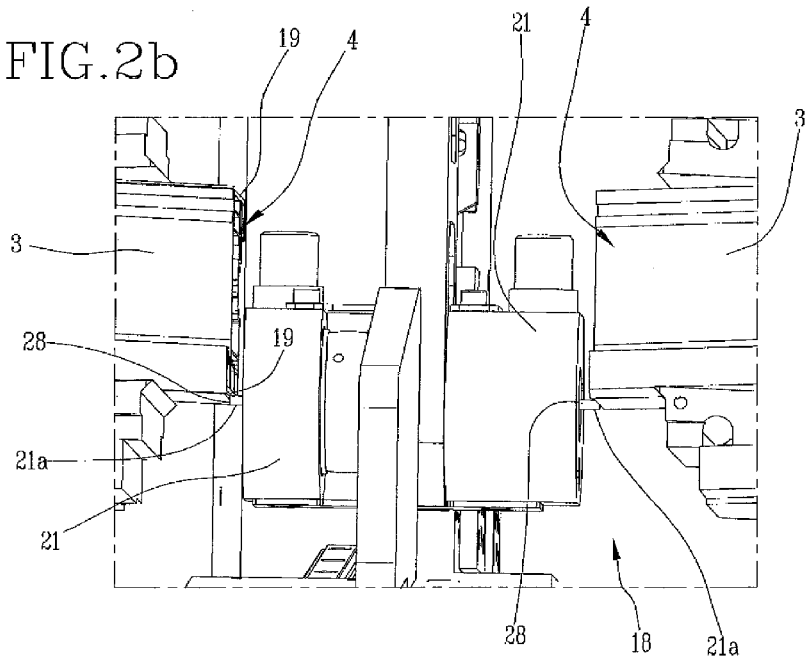
Figure 2C:
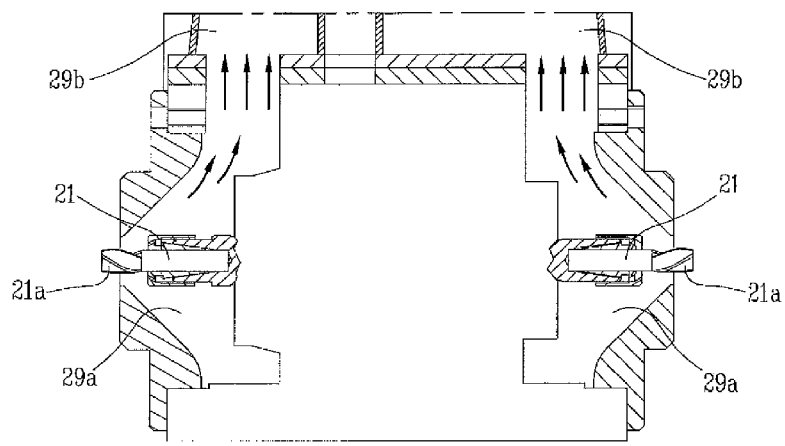
Figure 3:
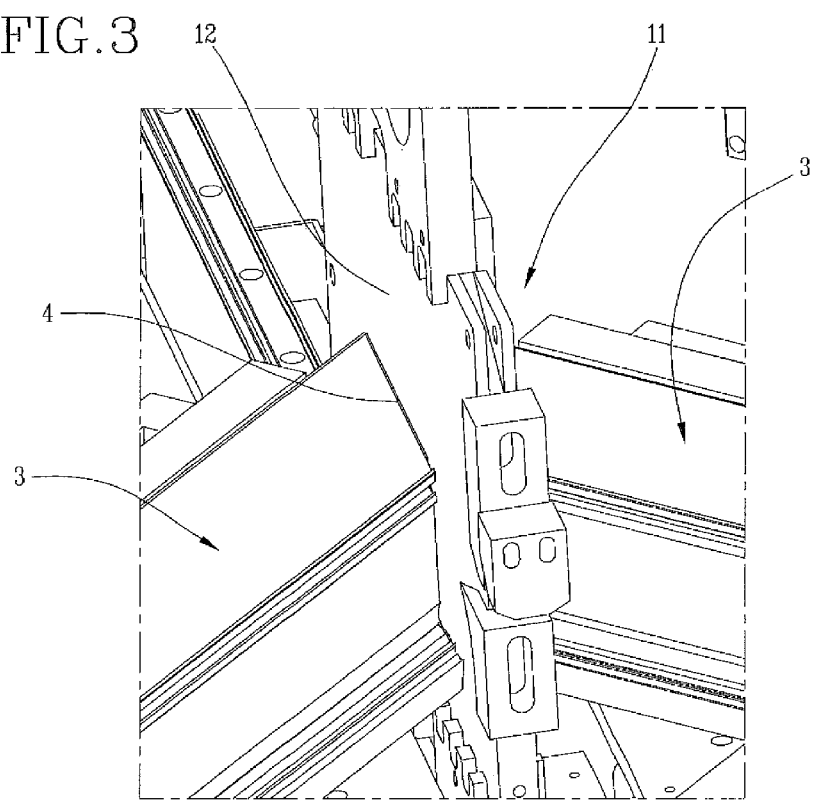
FIG. 3 show a detailed view of a further operating sequence.
Figure 6A:
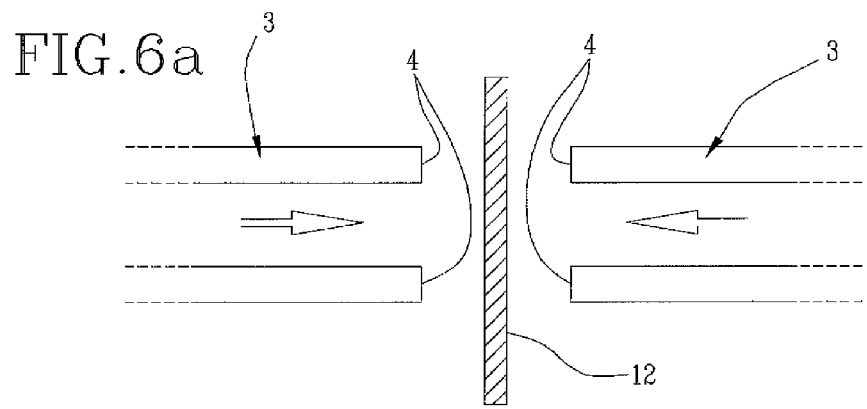
FIGS. 6a and 6b show schematically two subsequent steps of the traditional welding of the head extremities of the profiled elements, in particular the compression step wherein the formation of beads on both sides is highlighted: internal and external.
Figure 6B:
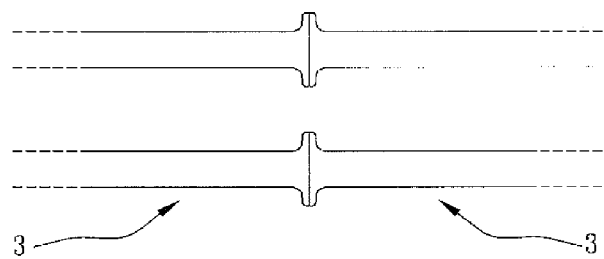

With reference to FIG. 1 it should be noted that the device 1 comprises a base frame 38 that supports a pair of retaining members 2 of respective profiled elements 3 in PVC, suitable for engaging the profiled elements 3 themselves with corresponding zones to be welded 4 facing one another.

In particular, each retaining member comprises a base portion 5 on which the profiled element 3 is positioned, and a mobile portion 6 arranged above the base portion 5. The mobile portion 6 is suitably moved to shift towards the base portion 5 and thus retain the profiled element 3.

As can be seen on the attached illustrations, each profiled element 3 is therefore arranged between the base portion 5 and the mobile portion 6, with the respective head extremity protruding. The head extremities of the profiled elements make up the zones to be welded 4 and for this reason they are facing one another.

It should also be noted that the zones to be welded 4 are suitably cut at 45° to define a coupling between two right-angled profiled elements.

Moreover, the device 1 comprises movement means 7 of the retaining members 2, to shift the profiled elements 3 between a first reciprocal away direction and a second reciprocal closer direction wherein the zones to be welded 4 are coupled together.

In particular, for each retaining member 2, the movement means 7 have a sliding guide 8, extending parallel to the longitudinal extension of the profiled element 3. On the sliding guide is fitted a carriage 9 integral with the aforementioned base portion 5. Furthermore, each carriage 9 is coupled with a movement system 10 (not described in detail because of known type and not forming a part of the present invention) suitable for moving both the carriages 9 of the retaining members 2 reciprocally closer/away. The device 1 also comprises heating means 11 for heating the aforementioned zones to be welded 4 of the profiled elements 3 in PVC. The heating means 11 are preferably mobile between an active condition wherein they are placed between the profiled elements 3, and a non-use condition wherein they are spaced at a distance from the profiled elements 3.

In particular, it should be noted that when the profiled elements 3 are arranged by the movement means 7 in reciprocal away direction, they define a transit zone of the heating means 11. This way, once the zones to be welded 4 have been heated, the profiled elements 3 are moved closer together and pressed with the respective extremity heads against one another.

Advantageously, the heating means 11 comprise a hot-plate heat-sealing element 12, made up e.g. of a substantially plate-shaped electric resistance 12, fitted on a movement system 13. Preferably, the movement system 13 is composed of a pair of carriages 14 mounted sliding in respective rails 15 and each of which arranged on opposite sides of the aforementioned resistance 12. This way, the resistance 12 is fastened to the carriages 14 and moved by these along the rails 15. The carriages 14 are also operatively connected to a motor 16, by means of a connecting rod-crank 17. Advantageously, the connecting rod-crank 17 transforms the rotary motion given by the motor 16 into a back and forth motion of the carriages 14 and of the resistance 12 to insert/remove the resistance 12 between/from the above-mentioned profiled elements 3.

The device 1 is also equipped with removal means 18 to make at least one groove 19 on the peripheral edge of at least one zone to be welded 4.

The removal means 18, e.g., are composed of means of removal by milling; alternative embodiments cannot however be ruled out wherein the removal means are of a different type and envisage, e.g., one or more hot points, which remove the plastic material by melting, or one or more ultrasonic points.

The removal means 18 by milling comprise a supporting frame 20 placed above the retaining members 2, and at least one machining tool 21 (a cutter), facing a profiled element 3 to make the above-mentioned groove 19 on the zone to be welded 4.

The tool 21 is moved by a motor part 22 preferably of the electric type and miniaturized, brushless sensorless with very high rotation speed.

Furthermore, the tool 21 is moved by a movement member 23, between a first idle condition (position in which it is placed between the profiled elements 3) and a second working condition in which it is placed between the profiled elements 3 in PVC.

In greater detail, the removal means 18 by milling preferably comprise a pair of machining tools 21, each of which equipped with an active head 21a on the peripheral edge of a respective zone to be welded 4.

As illustrated in the detail views, the tools 21 are opposite one another to work at the same time on both the profiled elements 3.

Furthermore, the frame 20 has a supporting bar 24 arranged above the retaining members 2 and designed to sustain the tools 21 which in this situation are mounted on a lower extremity of the bar 24 itself.

The bar 24 is operatively connected to the movement member 23 to be moved in correspondence to the zones to be welded 4.

Advantageously, the tools 21 are positioned in correspondence to the side edge of the zone 4 by means of the movement of the above-mentioned movement member 23.

In particular, the member 23 comprises a pair of supporting guides 25 on which the bar 24 is mounted sliding and moved by a known motor not described in detail.

Furthermore, the bar 24 is moved vertically by means of an axis with wormscrew 26 arranged in correspondence to the supporting frame 20.

Advantageously, both the tools 21 and the motor part 22 are supported by the bar 24 and are mobile with it both horizontally (along the guides 25) and vertically (by means of the wormscrew 26).

The movement of the bar 24 is by means of a controlled-axis system which enables the tools 21 to shift along the peripheral edge of the profiled elements 3 to obtain the grooves 19.

Thanks to the controlled-axis system, furthermore, the tools 21 are moved between an idle position, wherein they are not placed between the profiled elements 3, and a working position, wherein they are placed between the profiled elements 3.

The device 1 is also equipped with a containing presser 27 mobile along a direction transversal both to the direction of movement of the profiled elements 3 and to the lying plane on which they lie, to abut on the grooves 19 made in the respective zones to be welded. Such presser can be heated to better shape the plastic material underneath and can have protrusions or recesses to reproduce a special shape on the hot piece just machined. The still hot material is in fact easy to shape.

In particular, in the welding condition of the zones 4, i.e., when they are brought into contact and pressed with each other, the grooves 19 define a containing compartment 19a in reciprocal collaboration.

Depending on the shape of the grooves 19, the compartment 19a can be open or closed, as will be better described below.

In the event of the compartment 19a being open, it can be delimited by the containing presser 27 which prevents the melted material coming out of the compartment 19a. Preferably, two containing pressers 27 are prepared, each of which associable with a respective pair of opposite grooves 19 to define two containing compartments 19a for respective welding beads.

In particular, a first presser 27 is arranged above the profiled elements 3, while a second presser 27 is arranged underneath the profiled elements 3.

It will in fact be noted that the grooves 19 are applied for the externally visible portions of the profiled elements 3, i.e., the side edges cut at 45° which when welded together determine the formation of a protruding welding bead.

In this situation, the bead does not come out of the compartment 19a but is contained inside it.

In this context, the pressers 27 are mobile by means of suitable movement elements not described in detail and able to move closer to/away from the pressers 27 themselves during the various welding steps of the profiled elements 3.

The device 1 is furthermore equipped with an electrostatic part 28 for retaining the shavings that form during the removal operation by milling.

The electrostatic part 28 is made up of an electrode connected to the work tool 21 and connected to a high-voltage generator. This way, the shavings charged with negative polarity are retained by the head 21a of the cutter (which acts as an electrode) charged positively to avoid the dispersion of the mentioned shavings.

In collaboration with or alternatively to the electrostatic part 28, the device 1 has a vortex suction system 29a, 29b concentric with the tool 21 which permits removing the shavings which form during the removal operation by milling.

The suction system 29a, 29b, e.g., consists in a chamber 29a which is arranged around each tool 21 and which is connected to a suction duct 29b which moves the shavings away.

For this purpose, furthermore, the tool 21 consists of a helical-shaped cutter that conveys the removed shavings towards the inside of the chamber 29a to make suctioning the shavings easier.

Advantageously, all the PVC shavings produced by the removal operations by milling are easily suctioned.

The device 1 described above in prevalently structural terms implements a welding method which is also the subject of the present invention.

The method comprises the steps of preparing at least two profiled elements 3, arranged with the respective zones to be welded 4 facing one another, in correspondence to the retaining members.

Then, the grooves 19 are made in correspondence to each zone to be welded 4 of the profiled elements 3. The zones to be welded 4 are subsequently heated and coupled together by pressing the profiled elements 3 one against the other. This way the zones 4 are kept in reciprocal contact to melt the zones 4 together thus defining the welding bead.

In this respect, the fact is underlined that the step of making the grooves 19 also comprises leveling the parts of the zones to be welded 4 not occupied by the grooves 19.

In practice, the tools 21 are made to pass over the substantial totality of the zones to be welded 4 at different work depths:

in correspondence to the peripheral edges of the profiled elements 3, the work depth of the tools 21 is greater and such as to define the grooves 19;

in correspondence to the remaining parts of the zones to be welded 4, instead, the work depth of the tools 21 is less and such as to only remove a small layer of plastic material, enough to flatten and even out the zones 4 to be welded.

In other words, the purpose of the tools 21 is not only to shape the grooves 19 but these are also fundamental for evening out the walls and correcting any cutting errors. In the absence of such leveling, the zones to be welded 4 would be too irregular and therefore not weldable.

It is also underlined that the grooves 19 and the leveling of the zones to be welded 4 are made by the tools 21 of the device 1 when the profiled elements 3 are already mounted on the retaining members 2 and the zones to be welded 4 are coupled and melted together without demounting the profiled elements 3 from the retaining members 2.

In other words, the tooling of the profiled elements 3 on the retaining members 2 occurs just once and the device 1 is able to execute all the steps of the method according to the invention without the profiled elements 3 having to be prepared and/or machined on other machines.

Such peculiarity, besides ensuring very fast execution, permits avoiding welding errors due to the incorrect mounting of the profiled elements 3 on the retaining members 2.

In fact, if the zones to be welded 4 were leveled on a different machine and then mounted on the device 1 to be welded, the risk would exist of badly welding, the profiled elements 3 because the zones to be welded 4 might not be perfectly facing and parallel.

Figure 7A:
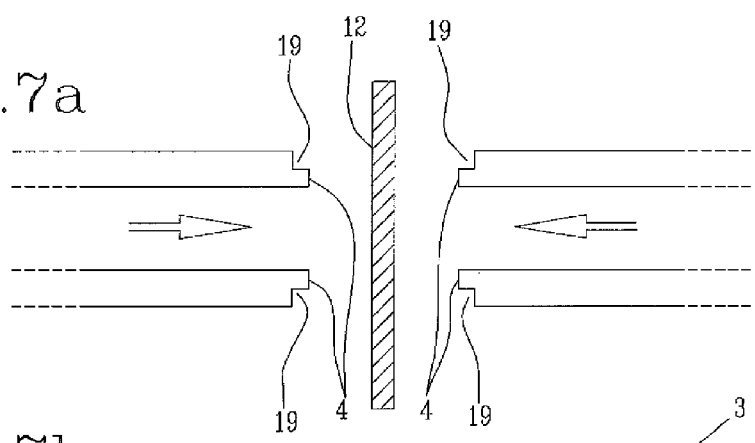
FIGS. 7a and 7b show schematically two subsequent steps of the welding of the head extremities of the profiled elements according to the invention wherein the formation of beads is highlighted only on the internal sides of the profiled elements, i.e. on the sides delimiting the internal space of the profiled element.
Figure 7B:
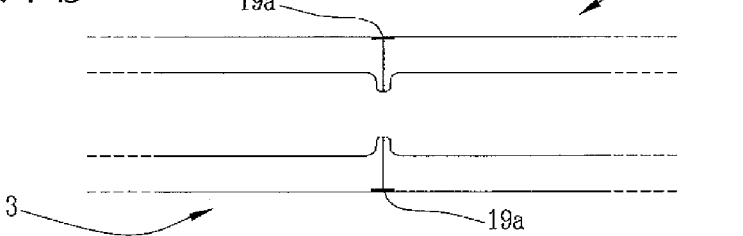

With reference to the solution schematically shown in the FIGS. 7a and 7b, the compartment 19a previously made by the grooves 19 is open, meaning it has a side turned towards the outside which remains substantially accessible and visible.

In the solution shown in the FIGS. 7a and 7b, therefore, the welding bead is retained within the volume of the compartment 19a by means of the presser 27 which closes one of its sides.

It will be noted in fact that when the profiled elements 3 are moved closer, the grooves 19 coincide with one another to define the compartment 19a. Furthermore, the presence of the presser 27 determines the closing of the compartment 19a which keeps the welding bead on the same level as the external visible surfaces of the profiled elements 3.

The step of making the groove 19 is implemented by means of a removal operation of material on the peripheral edges defined by the head extremities of each profiled element 3. This way, the groove 19 obtained has a substantially stepped conformation in square, i.e., shaped at 90°, which extends along the entire extension of the zone to be welded 4. Before the step of heating the zones to be welded 4, and in particular during the removal by milling step, the step is implemented of the retention of the shavings by means of the cutter tool 21 with helical shape and the axial suction which conveys the removed shavings towards the inside of the chamber 29a.

Figure 8A:
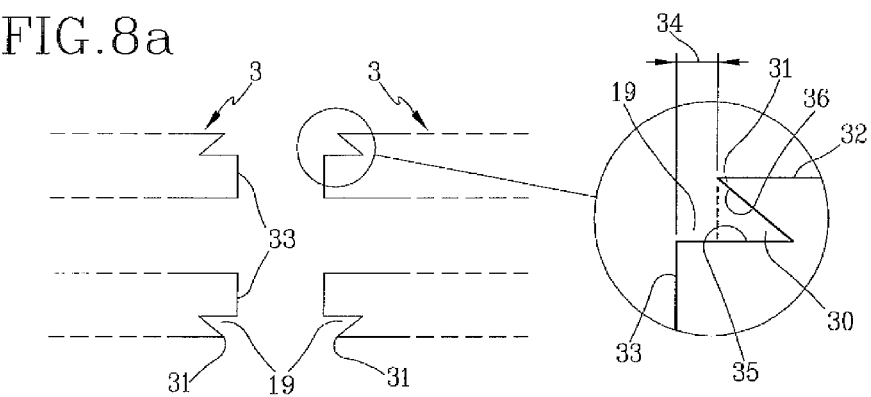
FIGS. 8a, 8b and 8c show schematically three subsequent steps of the welding of the head extremities of the profiled elements according to the invention wherein the formation and containing of beads is highlighted inside a compartment obtained underneath the surface in order to obtain the visible external side not melted.
Figure 8B:
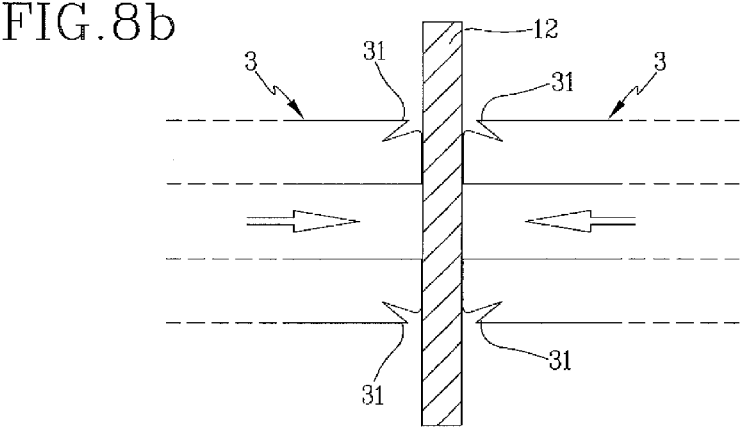
Figure 8C:
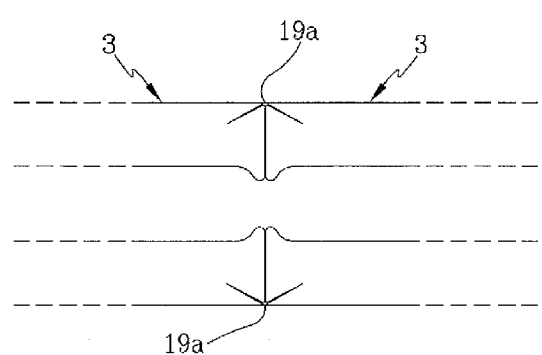

With reference to the solution shown in FIGS. 8a, 8b and 8c, the grooves 19 made in correspondence to each zone to be welded 4 comprise at least an undercut portion 30 to define at least a protruding corner 31 obtained on a visible surface portion 32 of the profiled elements 3.

Also in this case the step of making the grooves 19 is performed by means of a removal operation on a peripheral edge of each profiled element 3, with the difference that a tool 21 is used which is specifically shaped to make the undercut portion 30.

The tool 21, in particular, can be shaped so as to make the groove 19 and its undercut portion 30 with a single material removal stroke direct from the solid.

Alternative embodiments are however possible wherein the removal operation is done by means of two different tools 21, one for shaping the groove 19 in a way similar to that shown in the FIG. 7a, and one for obtaining only the undercut portion 30.

The groove 19 thus obtained has a stepped conformation in undercut, which extends along the entire extension of the zone to be welded 4.

The undercut step is at least partially obtained underneath the visible surface portion 32 of the profiled elements 3 to define the undercut portion 30 of the groove 19.

More in detail, it is underlined that, once the grooves 19 have been made:
the zones to be welded 4 comprise a head surface 33 suitable for coining into contact with the head surface 33 of the other zone to be welded 4 during the coupling step of the profiled elements 3; and
the protruding corners 31 are arranged at a predefined distance 34 from the lying plane on which the head surfaces 33 lie.

The predefined distance 34 is determined according to the quantity of plastic material to be melted during the coupling step of the profiled elements 3 and to the volume at disposal in the undercut portions 30 of the grooves 19 which, as will be better described below, is designed to collect the melted material at the end of the coupling step of the profiled elements 3.

Before the heating step, furthermore, the grooves 19 are delimited by a first surface 35 substantially at right angles to the head surfaces 33 and by a second surface 36 substantially oblique in correspondence to which said undercut portion 30 is defined. The second surface 36 is substantially sloped by an angle between 10° and 80° with respect to the visible surface portion 32 of the profiled elements 3.

Alternative embodiments of the present invention cannot however be ruled out wherein the grooves 19, and in particular the undercut portions 30 thereof, have a different conformation, e.g., curved or the like.

In the light of the specific conformation of the grooves 19, during the step of approach and coupling of the zones to be welded 4, the following sub-steps are completed:
bringing the protruding corners 31 together so they substantially coincide without substantially melting them; and
making a containing compartment 19a which is defined by the grooves 19 of each zone 4 and which, in correspondence to the visible surface portion 32 of the profiled elements 3 is closed by the protruding corners 31 brought close to one another.

In this configuration, therefore, the containing compartment 19a is closed and the welding bead is made inside the containing compartment 19a.

The plastic material melted in correspondence to the head surfaces 33 does in fact return up towards the visible surface portion 32 of the profiled elements 3 and remains trapped inside the containing compartment 19a.

In the case shown in the FIGS. 8a, 8b, 8c the containing pressers 27 are used resting on the profiled elements 3 in order to contain any leaking of the melted material through the protruding corners 31.

With reference to the solution shown in the FIGS. 9a, 9b, 9c and 9d, the groove 19 is only obtained on one of the profiled elements to be welded.

For this purpose, the profiled elements 3 can be split up into a first profiled element 3a, on which the groove 19 is made, and into a second profiled element 3b, on which, instead, the groove 19 is not obtained.

The step of making the groove 19 moulds the zone to be welded 4 of the first profiled element 3a so as to define a head surface 40 and a receding corner 41 obtained on a visible surface portion 42 of the first profiled element 3a.

Just as in the previous cases, in the solution shown in the FIGS. 9a, 9b, 9c, 9d as well, the step of making the groove 19 is implemented by means of a removal operation on a peripheral edge of the first profiled element 3a.

After the step of making the groove 19, an operation is performed consisting in the heating of the zones to be welded 4, which is performed by bringing the profiled elements 3a, 3b closer to the hot-plate heat-sealing element 12.

During this step, a sub-step is carried out consisting in dissolving the head surface 40 of the first profiled element 3a and only a part of the zone to be welded 4 of the second profiled element 3b, so as to define a receding surface 43 of the second profiled element 3b and a relief corner 44 obtained on a visible surface portion 42 of the second profiled element 3b.

For this purpose, in the solution shown in the FIGS. 9a, 9b, 9c and 9d the hot-plate heat-sealing element 12 has a first face 45, suitable for coming in contact with the head surface 40 of the first profiled element 3a, and a second face 46, 47 suitable for coming in contact with only one part of the zone to be welded 4 of the second profiled element 3b.

More in detail, the second face 46, 47 comprises at least one protruding part 46, suitable for coming in contact with the second profiled element 3b to define the receding surface 43, and at least one receding part 47, suitable for remaining spaced at a distance from the second profiled element 3b and for avoiding to come in contact with the relief corner 44.

Figure 9A:
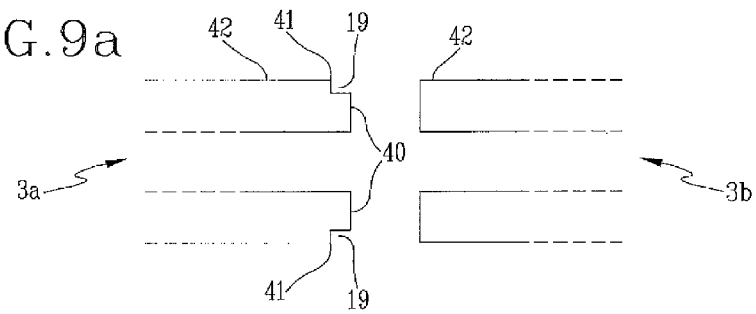
FIGS. 9a, 9b, 9c and 9d show schematically four subsequent steps of the welding of the head extremities of the profiled elements according to the invention wherein the formation of a containing barrier is highlighted defined by a receding corner moving closer to a relief corner and which determines the formation of beads on the internal sides only of the profiled elements, i.e. on the sides delimiting the internal space of the profiled element.
Figure 9B:
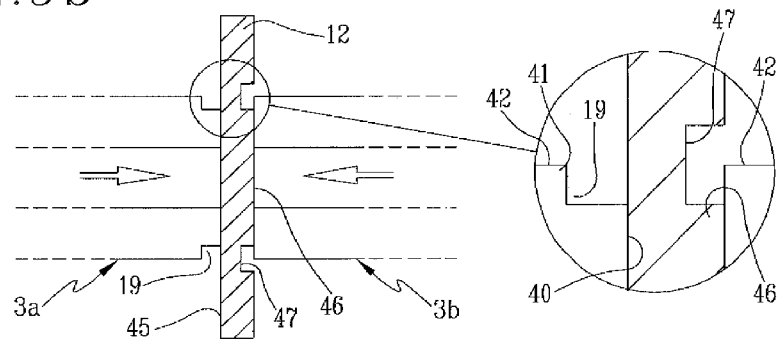
Figure 9C:
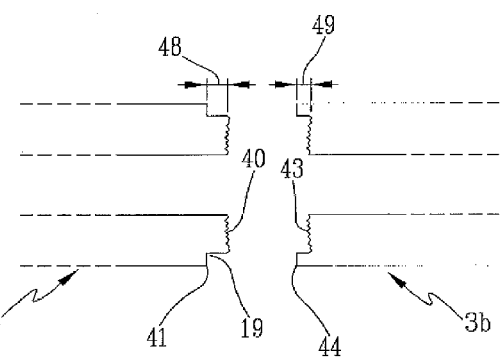
Figure 9D:
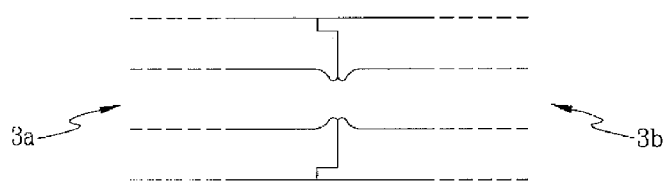

As can be seen in FIG. 9b, the second face 46, 47 has two receding parts 47 which operate on opposite sides of the second profiled element 3b.

The distance h between the receding parts 47 depends on the height of the second profiled element 3b; higher the second profiled element 3b, greater the distance between the receding parts 47.

For this purpose, the hot-plate heat-sealing element 12 can be split into at least two sections 12a, 12b reciprocally mobile to move the receding parts 47 close to and away from one another.

Figure 10A:
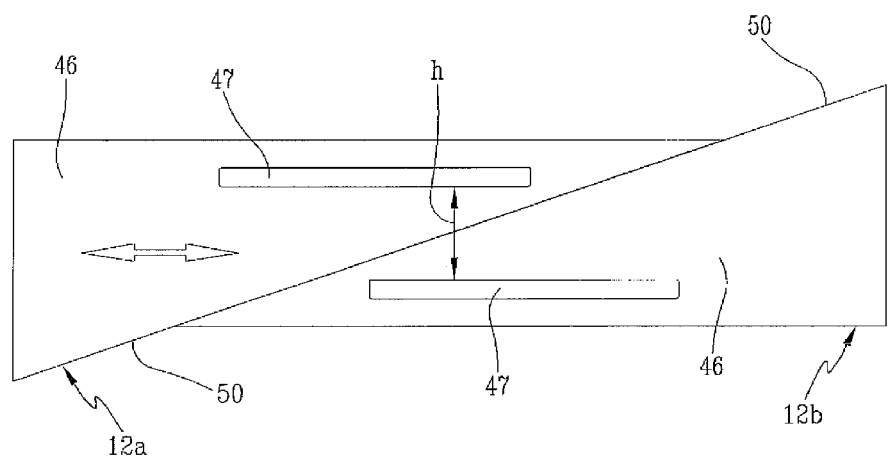
FIGS. 10a and 10b show, in a front view, the hot-plate heat-sealing element in FIG. 9b in two different operating positions.
Figure 10B:
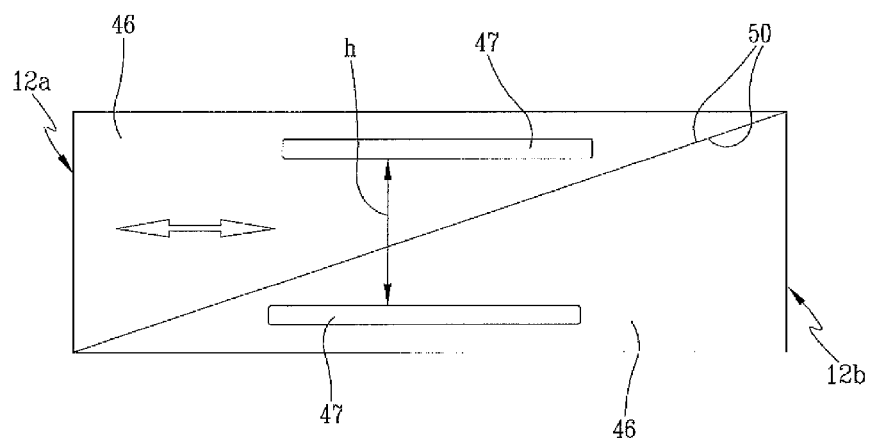

In the embodiment shown in the FIGS. 10a and 10b, e.g., each section 12a, 12b is wedge-shaped and has a sloping surface 50 which can slide on the sloping surface 50 of the other section 12a, 12b to change the distance h between the receding parts 47. Alternative equivalent solutions cannot however be ruled out such as, e.g., the case in which the second face 46, 47 consists of a kit of interchangeable sheets, shaped differently the one from the other (in particular, they have different distances h) and selectively associable with the hot-plate heat-sealing element 12 according to the height of the second profiled element 3b.

After the heating step, a coupling step is performed of the zones to be welded 4, which consists in reciprocally bringing the profiled elements 3a, 3b closer along the sliding guides 8 and which contemplates the sub-step of melting the zones 4 together to define the above welding bead.

In the light of the specific conformation of the receding corner 41, of the relief corner 44, of the head surface 40 and of the receding surface 43, during the coupling step the following sub-steps are also performed:
melting the head surface 40 together with the receding surface 43; and
bringing the receding corner 41 close to the relief corner 44 so they substantially coincide without substantially melting them, to define a confinement barrier of the welding bead.

For this purpose is it underlined that, after the heating step and before the coupling step of the profiled elements 3a, 3b, the receding corner 41 of the first profiled element 3a is arranged at a first predefined distance 48 from the lying plane on which the head surface 40 of the first profiled element 3a lies.

In the same way, after heating and before coupling, the relief corner 44 of the second profiled element 3b is arranged at a second predefined distance 49 from the lying plane on which said receding surface 43 of the second profiled element 3b lies.

Usefully, the first predefined distance 48 is greater or the same as the second predefined distance 49 and, preferably, it is slightly greater, so that at the time of the coupling of the profiled elements 3a, 3b, the head surface 40 and the receding surface 43 come into contact and melt together, while the receding corner 41 and the relief corner 44 simply rest against one another without melting.

The first predefined distance 48 and the second predefined distance 49 are established according to the quantity of plastic material to be melted during the coupling step of the profiled elements 3a, 3b.

In this configuration, therefore, the containing compartment 19a in which the welding bead remains confined is defined by the space underneath the confinement barrier.

It is in fact underlined that the plastic material melted in correspondence to the head surface 40 and of the receding surface 43 remains contained inside the containing barrier defined by the receding corner 41 and by the relief corner 44 and has no way of surfacing outside the profiled elements 3a, 3b. In the case shown in the FIGS. 9a, 9b, 9c the containing pressers 27 are used resting on the profiled elements 3a, 3b to curb any melted material leaking through the receding corner 41 and the relief corner 44.

The adhesion capacity of the door or window frame in correspondence to the welded extremities depends on the extension of the working surfaces of the profiled elements 3 which is placed in reciprocal contact and which, other sizings being equal, is determined by the thickness of the wall of the profiled elements 3.

The presence of the grooves 19 determines the reduction of the wall thickness of the profiled elements 3 and, other conditions being equal, the working surface to be melted and welded.

To ensure greater adhesion and increase the mechanical strength of the end door or window frames, the figures from 11 to 18 show an alternative embodiment of the device or machine 1.

In this embodiment, the profiled elements worked by the machine 1 are split up into a first profiled element 60 and a second profiled element 61, having a first zone to be welded 62 and a second zone to be welded 63, respectively.

The machine 1 comprises a base frame 38, retaining members 2, movement means 7, removal means 18 and containing pressers 27 exactly the same as those mentioned above, to the detailed description of which full reference is made.

The hot-plate heat-sealing element 12 shown in the embodiment of the figures from 11 to 18 has a first face 64 and a second face 65 opposite one another against which the zones to be welded 62, 63 are placeable in contact to be heated.

Advantageously, the hot-plate heat-sealing element 12 consists of a single resistance, with a substantially plate-shaped conformation and which, by means of an electric circuit 66, is supplied with electricity to produce heat by joule effect.

The first face 64 and the second face 65 are therefore defined by the main surfaces of the electric resistance 12.

It is easy to understand however that alternatively the hot-plate heat-sealing element 12 can consist of a support plaque which, on opposite sides, supports two or more separate electrical resistances, one of which defines the first face 64 while the other defines the second face 65.

Alternatively, it is possible to have a hot-plate heat-sealing element 12 made up of one or more electric resistances with flat faces covered with a series of shaped elements, in a heating conductive material, which define the first face 64 and the second face 65; in this case, the shaped elements can usefully consist of a piece of metal plate subject to bending, pressing or other type of shaping useful to shape the faces 64, 65 in a way that will be better described below.

In a further alternative embodiment, it is possible for the hot-plate heat-sealing element 12 not to consist of an electric resistance but, rather, of one or more induction heating plates.

According to the present invention, the hot-plate heat-sealing element 12 is shaped in such a way that:

the first face 64 comprise a plurality of first recesses 64a and of first protrusions 64b alternated the one with the other and suitable for making on the first zone to be welded 62 a plurality of first reliefs 62a and of first cavities 62b respectively;

the second face 65 comprises a plurality of second recesses 65a and of second protrusions 65b alternated the one with the other and suitable for making on the second zone to be welded 63 a plurality of second reliefs 63a and of second cavities 63b respectively.

The zones to be welded 62, 63, thus heated and shaped, can be joined together with the first reliefs 62a inserted in correspondence to the second cavities 63b and with the second reliefs 63a inserted in correspondence to the first cavities 62b.

Figure 13:
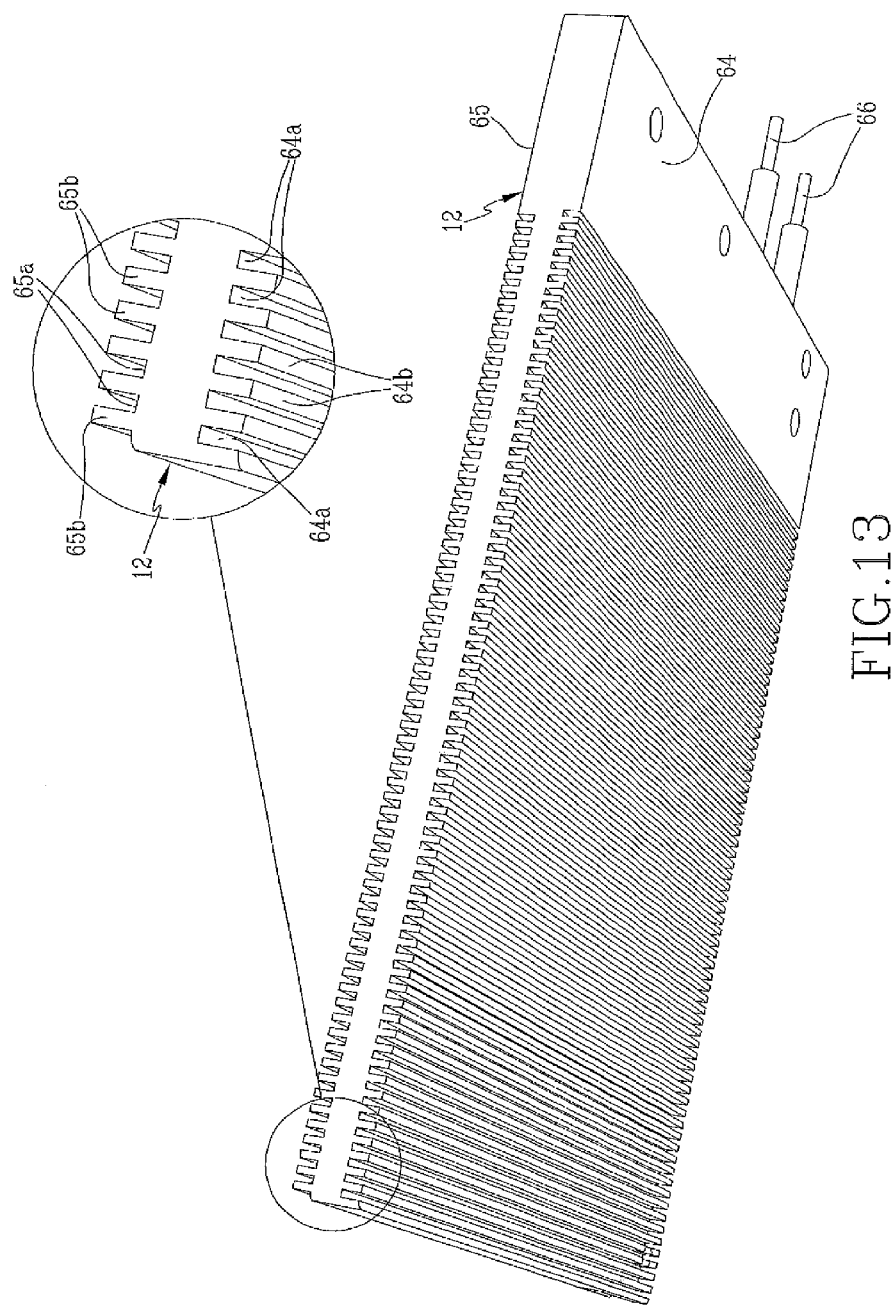
FIG. 13 is a perspective view, on enlarged scale, of a detail of the device in FIG. 11.
Figure 14:
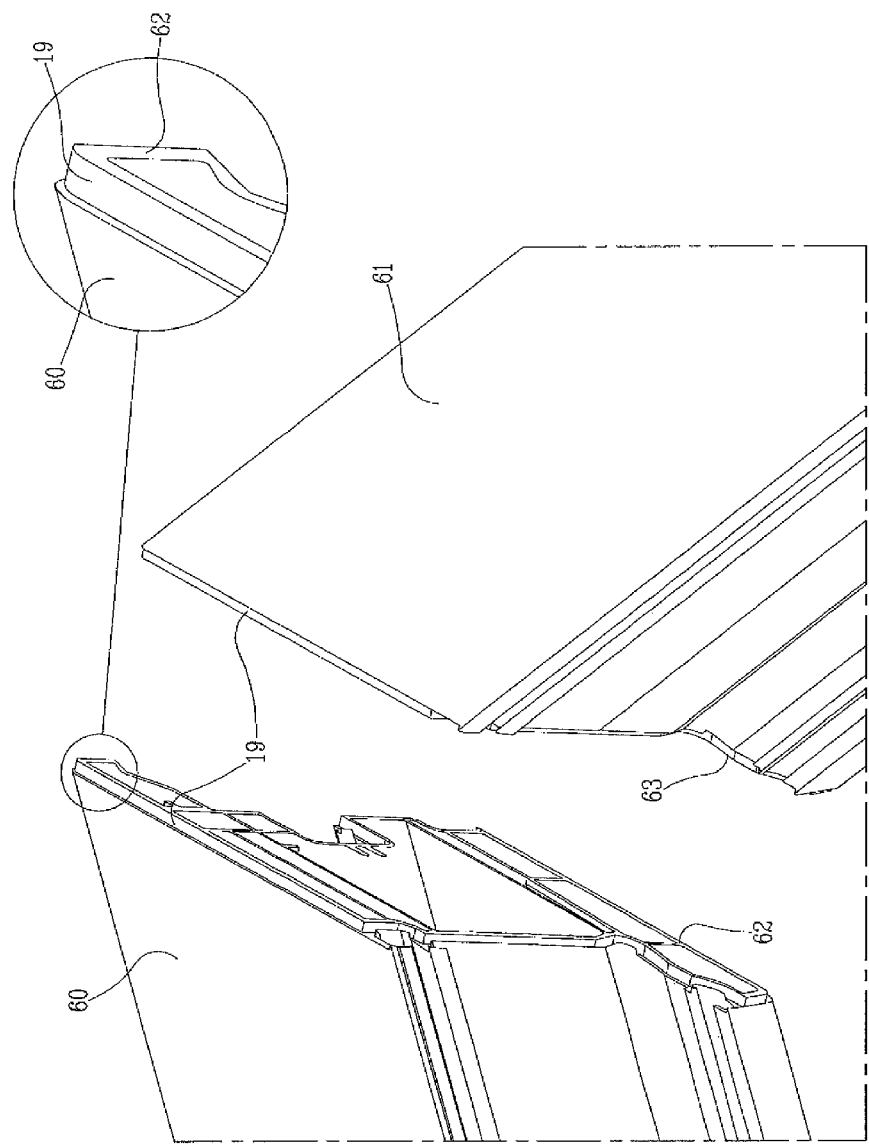
FIG. 14 is an axonometric view, on enlarged scale, of a detail of the profiled elements before welding.

As can be seen in FIG. 13, the first recesses 64a are arranged on the hot-plate heat-sealing element 12 opposite the second protrusions 65b and the first protrusions 64b are arranged opposite the second recesses 65a.

This means that where the first face 64 has a first recess 64a, the second face 65 has a second protrusion 65b, and where the first face 64 has a first protrusion 64b, the second face 65 has a second recess 65a.

Alternative embodiments cannot however be ruled out wherein the recesses 64a, 65a of one face 64, 65 are not perfectly opposed to the protrusions 64b, 65b of the other face 64, 65 and are more of less staggered with respect to these.

The first recesses 64a are shaped substantially complementary to the second protrusions 65b and, in the same way, the first protrusions 64b are shaped substantially complementary to the second recesses 65a.

Embodiments are also possible, however, wherein the recesses 64a, 65a and the protrusions 64b, 65b are not perfectly complementary.

In the embodiment shown in the illustrations, the recesses 64a, 65a and the protrusions 64b, 65b of the two faces 64, 65 extend along rectilinear lines parallel to one another. Usefully, the dimensions of the recesses 64a, 65a and protrusions 64b, 65b made this way vary between 0.5 and 2 mm of thickness and between 1 and 4 mm of depth and are preferably equal to about 1 mm of thickness and 2 mm of depth.

Such sizing permits cutting the profiled elements 60, 61 in the best way to obtain an intimate adhesion between the reliefs 62a, 63a and the cavities 62b, 63b during their joining and welding.

For reasons of clarity and simplicity of representation, the illustrations do not always show the real dimensions of the recesses 64a, 65a, of the protrusions 64b, 65b, of the reliefs 62a, 63a and of the cavities 62b, 63b, which have sometimes been accentuated to permit a greater understanding of the present invention.

In the embodiment shown in the illustrations, the rectilinear lines along which the recesses 64a, 65a, of the protrusions 64b, 65b extend are substantially at right angles to the lying plane on which the profiled elements 60, 61 lie and, in other words, are vertical.

It is however easy to understand that, alternatively, the above rectilinear lines can be positioned parallel to the lying plane on which the profiled elements 60, 61 lie and therefore horizontally.

In another embodiment, instead, the rectilinear lines can be positioned oblique with respect to the lying plane on which the profiled elements 60, 61 lie.

It cannot be ruled out that the recesses 64a, 65a and the protrusions 64b, 65b have a different conformation with respect to the linear one and, e.g., be substantially punctiform.

In this latter case, the protrusions 64b, 65b are defined by an alternation of tapered cusps opposed to recesses 64a, 65a defined by a series of cavities, these too tapered, cusps and cavities being arranged in chequered fashion.

Usefully, the faces 64, 65 of the hot-plate heat-sealing element 12 are covered with a non-slip material which prevents the plastic of the profiled elements 60, 61 from adhering to the resistance 12 and remaining trapped inside the recesses 64a, 65a.

Such non-slip material, e.g., consists of teflon, ceramics, or teflon spray.

For any event, however, the machine 1 also comprises cleaning means 67 associated with the base frame 38 and suitable for removing any portion of plastic which has remained attached to the hot-plate heat-sealing element 12.

The cleaning means 67 are composed, e.g., of a pair of brushes suitable for passing over the first face 64 and over the second face 65 respectively.

Figure 11:
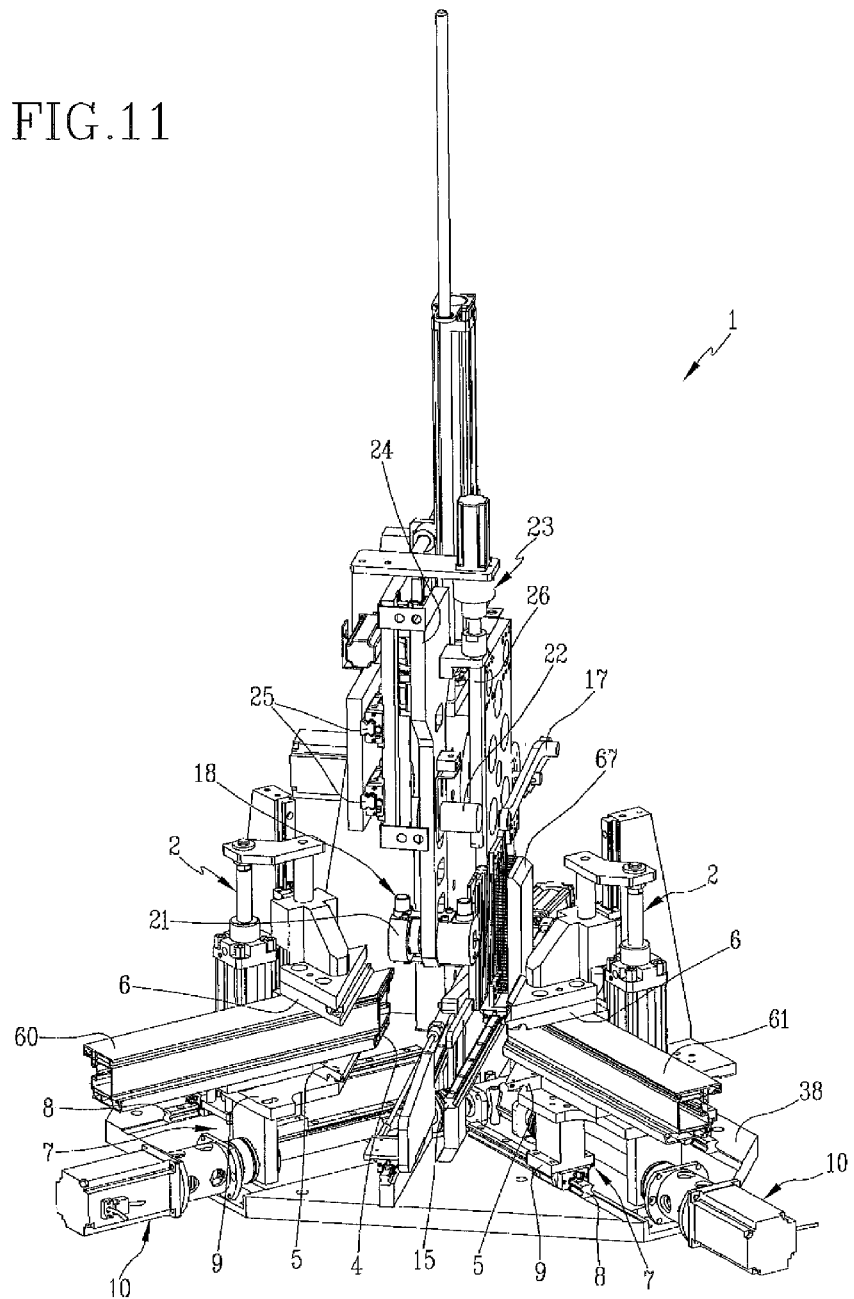
FIG. 11 is an axonometric view of an alternative embodiment of the device according to the invention.
Figure 12:
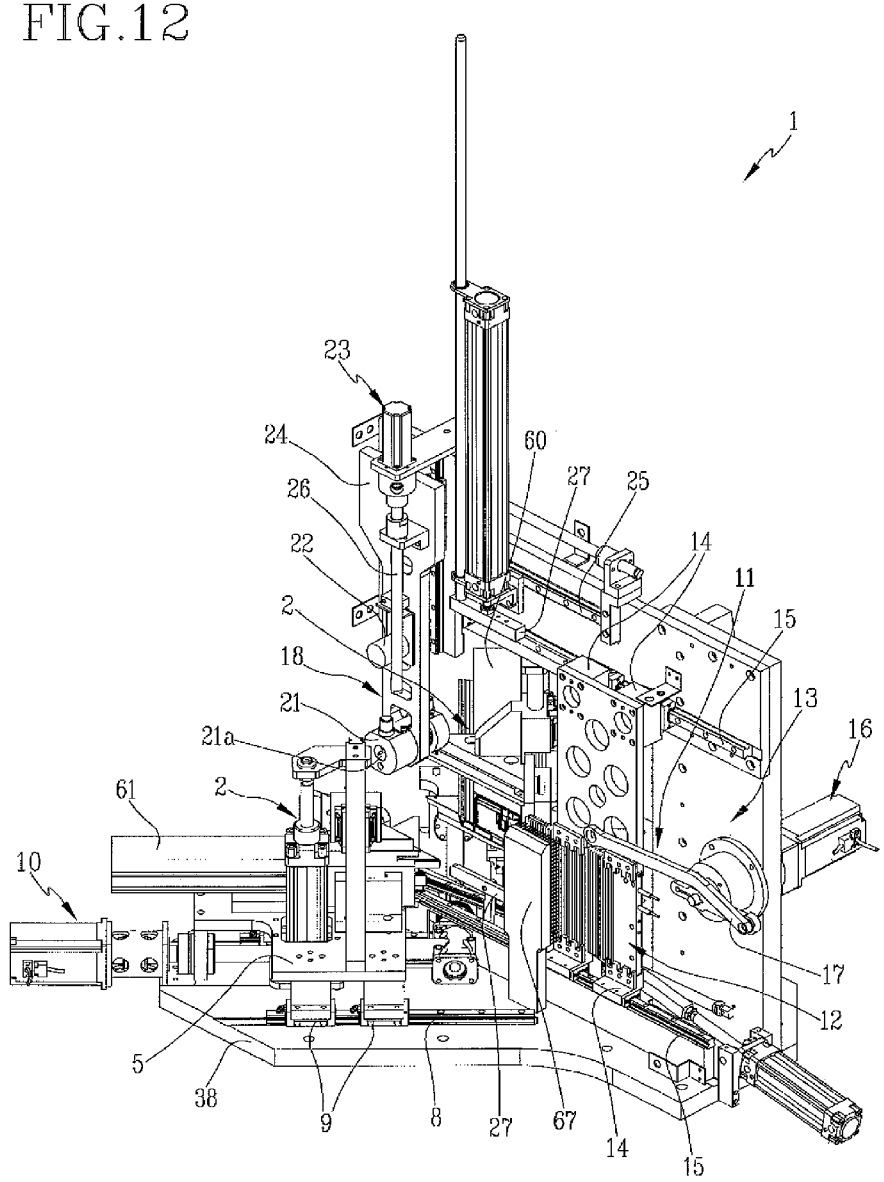
FIG. 12 is an axonometric view, from another angle, of the device in FIG. 11.

The FIGS. 11 and 12 only show the brush 67 intended to clean the second face 65, but it is easy to appreciate that an identical brush 67, is provided to clean the first face 64. The brushes 67 are fitted on the base frame 38 of the machine 1 in a fixed way and on opposite sides with respect to the movement path of the hot-plate heat-sealing element 12.

This way, the brushes 67 have the chance to pass over the faces 64, 65 during the transit of the hot-plate heat-sealing element 12 between the active condition and the non-use condition operated by the movement system 13.

Alternative embodiments cannot however be ruled out wherein the brushes 67 have a mobility such as to make the cleaning operation of the faces 64, 65 easier.

Figure 15:
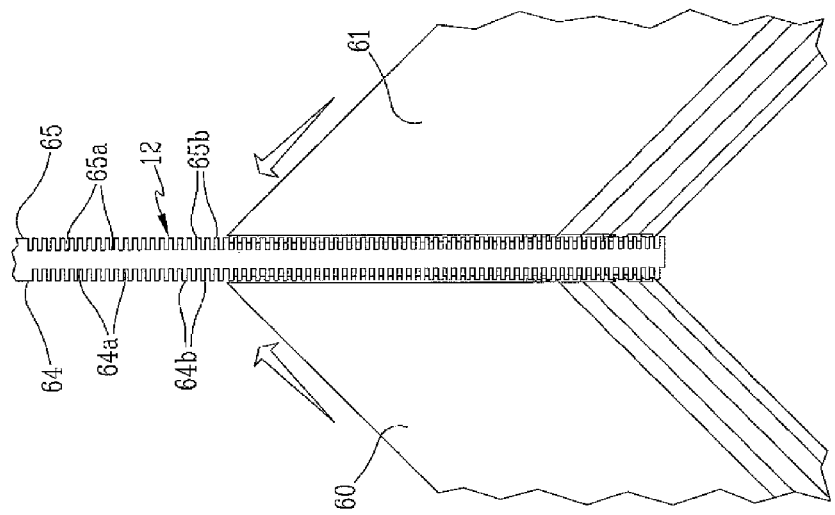
Figure 16:
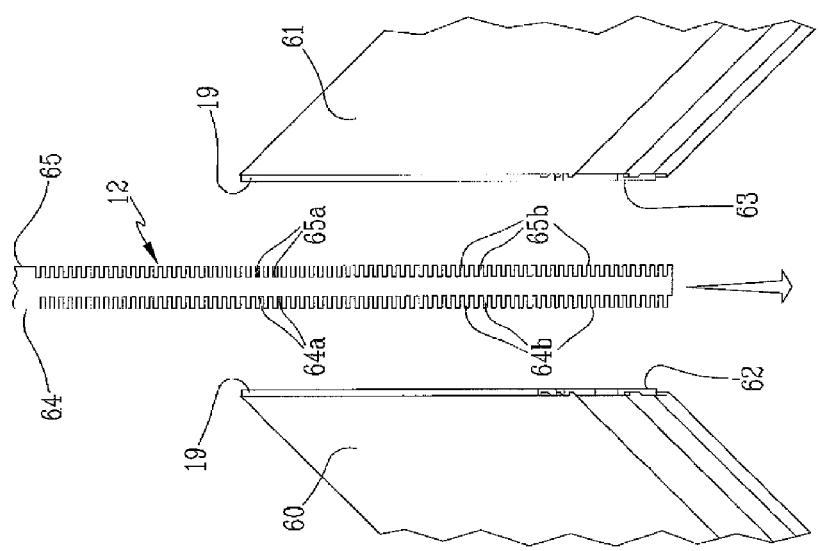

Consistently with the embodiment of the machine 1 shown in the figures from 11 to 18, the method or procedure according to the present invention contemplates heating the zones to be welded 62, 63 moving them closer together and placing them in contact with the faces 64, 65 of the hot-plate heat-sealing element 12 (FIGS. 15 and 16).

The conformation of the faces 64, 65 results in the first reliefs 62a and the first cavities 62b being made on the first zone to be welded 62 and in the second reliefs 63a and the second cavities 63b being made on the second zone to be welded 63 (FIG. 17).

At this point, the heated zones to be welded 62, 63 are coupled together by pressing, with adequate pressure, the profiled elements one against the other to keep the zones to be welded 62, 63 in reciprocal contact.

This step of the procedure occurs taking care to arrange the first reliefs 62a in correspondence to the second cavities 63b and the second reliefs 63a in correspondence to the first cavities 62b.

Subsequently, the faces 64, 65 of the hot-plate heat-sealing element 12 are cleaned so as to remove any portions of plastic which have remained attached to the hot-plate heat-sealing element 12.

This part of the procedure is performed by passing the brushes 67 over the first face 64 and the second face 65 respectively during the movement of the hot-plate heat-sealing element 12 between the active condition and the non-use condition.

The present invention achieves the proposed objects. In particular, the possibility of maintaining the welding bead inside the compartment 19a and the operation of the containing pressers 27 prevents excess material coming out. Consequently, all the surface finishing jobs suitable for removing excess material are eliminated, with the consequent advantages in terms of time, energy and saving relating to the use of further machinery.

Furthermore, the removal operation ensures the leveling of the surfaces of the profiled elements 3 in reciprocal contact, with the consequent saving of the material which, at present, has to be melted to obtain the required amount.

It is further underlined that the particular solution of providing recesses and protrusions on the welding plate and of making reliefs and cavities on the zones to be welded permits considerably increasing the strength and mechanical tightness of the welding.

The reciprocal coupling of the reliefs and cavities in the ways indicated by the present invention does in fact determine the intimate adhesion of the zones to be welded by virtue of the fact that the contact surface is greater compared to a traditional coupling between perfectly flat zones to be welded.

It must also be underlined that the moving away of the welding plate and the surface tension of the melted material usually determine the formation of a thin surface repellent layer, so-called "skin", which at least in part hinders the subsequent adhesion of the extremities of the profiled elements; the presence of reliefs and cavities, alternated the one with the other, on the other hand, strongly hinders the formation of the "skin" surface layer, which tends to only form in the most exposed parts of the reliefs, without affecting the cavities.

For all these reasons, we witness an increase in the adhesion capacity between the two head extremities of the profiled elements which permits achieving a roughly 30% improvement in ultimate strength.

In this respect, a series of laboratory tests have been performed on several pairs of test profiled elements of the same shape and size and which, other conditions being equal, only differ in terms of the following characteristics:
A) non-milled test profiled elements, i.e., without grooves 19, and traditionally welded, i.e., by means of a welding plate without recesses 64a, 65a and protrusions 64b, 65b;
B) non-milled test profiled elements but welded according to the invention, i.e., by means of a welding plate with the recesses 64a, 65a and the protrusions 64b, 65b;
C) milled test profiled elements, i.e., having grooves 19, but traditionally welded;
D) test profiled elements milled and welded according to the invention.

By way of example, by indicating as 1 kg the ultimate strength value for case A) and comparing such reference value with the data acquired for the cases B), C) and D), the following results are obtained:

| | |
|---|---|
| ultimate strength of case A): | 1 kg |
| ultimate strength of case B): | 1.3 kg |
| ultimate strength of case C): | 0.83 kg |
| ultimate strength of case D): | 1.1 kg |

As can be seen from the obtained data, therefore, it appears evident that the use of a welding plate with recesses 64a, 65a and protrusions 64b, 65b permits strengthening the connection between the profiled elements both when there are no grooves 19 (switch from 1 kg to 1.3 kg) and when there are grooves (switch from 0.83 kg to 1.1 kg).

It is also underlined that, compared to a traditional welding, the adoption of the grooves 19 intended to create a containing compartment for the welding bead determines a considerable reduction in strength (switch from 1 kg to 0.83 kg) due to the reduction in thickness of the wall of the profiled elements but, by means of the present invention, the strength limit can be returned to values above initial values (switch from 0.83.1 g to 1.1 kg).

The particular solution of combining the removal means 18 and the welding plate 12 with recesses 64a, 65a and protrusions 64b, 65b on a single welding machine, therefore permits obtaining a result never before achieved to make window and door frames in a plastic material of considerable sturdiness and with an appreciable aesthetic appearance, which do not require additional finishing operations.

The invention claimed is:

1. A device for welding profiled elements in plastic material, the device comprising:
    a base frame (38) that supports a pair of retaining members (2) of respective profiled elements (3; 3a, 3b; 60, 61), to engage said profiled elements (3; 3a, 3b; 60, 61) with corresponding zones to be welded (4; 62, 63) facing one another;
    a heating means (11) for heating said zones to be welded (4; 62, 63) of the profiled elements (3; 3a, 3b; 60, 61), wherein,
    said heating means comprises at least a hot-plate heat-sealing element (12), and
    said heating means is mobile between i) an active condition, wherein said heating means is placed between said profiled elements (3; 3a, 3b; 60, 61), and ii) a non-use condition, wherein said heating means is spaced at a distance from said profiled elements (3; 3a, 3b; 60, 61);
    a movement means (7) of said retaining members (2), to shift the profiled elements (3; 3a, 3b; 60, 61) between a first reciprocal away direction and a second reciprocal closer direction wherein the zones to be welded (4; 62, 63) are coupled together;
    a removal means (18) to make at least one groove (19) on a peripheral edge of at least one of said zones to be welded (4; 62, 63), wherein said at least one groove (19) is applied for externally visible portions of said profiled elements (3); and
    at least one containing presser (27), mobile along a direction transversal to the direction of movement of the profiled elements (3; 3a, 3b; 60, 61), to abut on said at least one groove (19) made in said at least one of said zones to be welded (4; 62, 63), wherein,
    a containing compartment (19a) of a welding bead is defined by said at least one containing presser (27) in collaboration with said at least one groove (19),
    said containing compartment (19a) is open, said containing compartment (19a) having a side turned towards the outside which remains substantially accessible and visible, and
    said containing presser (27) determines closing of the containing compartment (19a) which keeps the welding bead on a same level as the external visible surfaces of the profiled elements (3).

2. The device according to claim 1, wherein said removal means (18) is a milling means comprised of:
    a supporting frame (20) positioned in correspondence to said retaining members (2);

at least one machining tool (21), facing one of said profiled elements (3; 3*a*, 3*b*; 60, 61) to make said groove (19) on the zone to be welded (4; 62, 63);

a motor part (22) associated with said tool (21); and a movement member (23) of the tool (21), to move said tool between a first idle condition and a second working condition wherein said tool is placed between the profiled elements (3; 3*a*, 3*b*; 60, 61).

3. The device according to claim 2, wherein said device comprises a pair of machining tools (21), each of which equipped with an active head (21*a*) on a peripheral edge of a respective zone to be welded (4; 62, 63) to make said groove (19); said tools (21) being opposite one another to work at the same time on two facing edges of the profiled elements (3; 3*a*, 3*b*; 60, 61).

4. The device according to claim 3, wherein said supporting frame (20) comprises a supporting bar (24) arranged above the retaining members (2); said tools (21) being mounted on the extremity of the bar (24) and said motor part (22) being engaged on said bar (24).

5. The device according to claim 1, wherein said device comprises a pair of said containing pressers (27), each of which associable with a respective pair of opposite grooves (19) to define two containing compartments (19*a*) for respective welding beads.

6. The device according to claim 2, wherein said device comprises an aspirator to remove shavings that form during a removal operation by milling of the profiled elements (3; 3*a*, 3*b*; 60, 61).

7. A device for welding profiled elements in plastic material, the device comprising:

a base frame (38) that supports a pair of retaining members (2) of respective profiled elements (3; 3*a*, 3*b*; 60, 61), to engage said profiled elements (3; 3*a*, 3*b*; 60, 61) with corresponding zones to be welded (4; 62, 63) facing one another;

a heating means (11) for heating said zones to be welded (4; 62, 63) of the profiled elements (3; 3*a*, 3*b*; 60, 61), wherein, said heating means comprises at least a hot-plate heat-sealing element (12), and said heating means is mobile between i) an active condition, wherein said heating means is placed between said profiled elements (3; 3*a*, 3*b*; 60, 61), and ii) a non-use condition, wherein said heating means is spaced at a distance from said profiled elements (3; 3*a*, 3*b*; 60, 61);

a movement means (7) of said retaining members (2), to shift the profiled elements (3; 3*a*, 3*b*; 60, 61) between a first reciprocal away direction and a second reciprocal closer direction wherein the zones to be welded (4; 62, 63) are coupled together;

a removal means (18) to make at least one groove (19) on a peripheral edge of at least one of said zones to be welded (4; 62, 63); and at least one containing presser (27), mobile along a direction transversal to the direction of movement of the profiled elements (3; 3*a*, 3*b*; 60, 61), to abut on said at least one groove (19) made in said at least one of said zones to be welded (4; 62, 63), wherein, said profiled elements (3; 3*a*, 3*b*; 60, 61) comprise a first and a second profiled element (60, 61) having a first and a second zone to be welded (62, 63), respectively;

said hot-plate heat-sealing element (12) has a first face (64) and a second face (65) opposite one another on which said zones to be welded (62, 63) can be placed in contact, wherein:

said first face (64) comprises a plurality of first recesses (64*a*) and of first protrusions (64*b*) suitable for making a plurality of first reliefs (62*a*) and of first cavities (62*b*) on said first zone to be welded (62);

said second face (65) comprises a plurality of second recesses (65*a*) and of second protrusions (65*b*) suitable for making a plurality of second reliefs (63*a*) and of second cavities (63*b*) on said second zone to be welded (63); and said heated zones to be welded (62, 63) can be joined together with said first reliefs (62*a*) in correspondence to said second cavities (63*b*) and with said second reliefs (63*a*) in correspondence to said first cavities (62*b*).

8. The device according to claim 7, wherein on said hot-plate heat-sealing element (12) said first recesses (64*a*) are arranged opposite said second protrusions (65*b*) and said first protrusions (64*b*) are arranged opposite said second recesses (65*a*).

9. The device according to claim 7, wherein said first recesses (64*a*) are shaped substantially complementary to said second protrusions (65*b*) and said first protrusions (64*b*) are shaped substantially complementary to said second recesses (65*a*).

10. The device according to claim 7, wherein said recesses (64*a*, 65*a*) and said protrusions (64*b*, 65*b*) extend along rectilinear lines parallel to one another and substantially at right angles to the lying plane on which said profiled elements (60, 61) lie.

11. The device according to claim 7, wherein said device comprises cleaning means (67) associated with said base frame (38) and suitable for removing any portion of plastic which has remained attached to the hot-plate heat-sealing element (12), and wherein said cleaning means (67) comprise a pair of brushes suitable for passing over said first face (64) and over said second face (65) respectively.

12. The device of claim 1, wherein said removal means (18) is a milling means comprised of a supporting frame (20) placed above the retaining members (2), and a pair of motorized cutters (21), each of the pair of motorized cutters (21) including an active head (21*a*), the active heads (21*a*) of the pair of motorized cutters (21) being positioned opposite each other such that in operation the active heads (21*a*) of the pair of motorized cutters (21), at the same time, work on both the respective profiled elements (3).

\* \* \* \* \*